(12) United States Patent
Zhang et al.

(10) Patent No.: US 12,131,543 B2
(45) Date of Patent: Oct. 29, 2024

(54) SEMANTIC-BASED METHOD AND APPARATUS FOR RETRIEVING PERSPECTIVE IMAGE

(71) Applicants: Tsinghua University, Beijing (CN); Nuctech Company Limited, Beijing (CN)

(72) Inventors: Li Zhang, Beijing (CN); Zhiqiang Chen, Beijing (CN); Yuanjing Li, Beijing (CN); Yuxiang Xing, Beijing (CN); Fanhua Meng, Beijing (CN); Qiang Li, Beijing (CN); Wei Li, Beijing (CN); Gang Fu, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 686 days.

(21) Appl. No.: 17/202,088

(22) Filed: Mar. 15, 2021

(65) Prior Publication Data

US 2021/0286842 A1     Sep. 16, 2021

(30) Foreign Application Priority Data

Mar. 16, 2020   (CN) .......................... 202010184164.X

(51) Int. Cl.
*G06F 16/583* (2019.01)
*G06F 16/55* (2019.01)
(Continued)

(52) U.S. Cl.
CPC .............. *G06V 20/52* (2022.01); *G06F 16/55* (2019.01); *G06F 16/583* (2019.01);
(Continued)

(58) Field of Classification Search
None
See application file for complete search history.

(56) References Cited

U.S. PATENT DOCUMENTS 10,713,794 B1 * 7/2020 He .......................... G06N 3/084
10,796,098 B2   10/2020 Sugiura et al.
2021/0272295 A1 * 9/2021 Ahmadi .................. G06T 7/207

FOREIGN PATENT DOCUMENTS

JP       2006235715 A  *  9/2006
JP       2017-097853 A    6/2017
(Continued)

OTHER PUBLICATIONS

Extended European Search Report for Application No. 21162895.3 dated Jul. 28, 2021, in 9 pages.
(Continued)

*Primary Examiner* — Bernard Krasnic
(74) *Attorney, Agent, or Firm* — Knobbe, Martens, Olson & Bear, LLP

(57) ABSTRACT

A semantic-based method and apparatus for retrieving a perspective image, an electronic device and a computer-readable storage medium are provided. An method includes obtaining a perspective image for a space containing an inspected object therein. A semantic division on the perspective image is performed using a first method, to obtain a plurality of semantic region units. A feature extraction network is constructed using a second method. Based on the perspective image and each of the plurality of semantic region units, a feature of each semantic region unit is extracted using the feature extraction network. Based on the feature of each semantic region unit, an image most similar to the semantic region unit is retrieved from an image feature database, to assist in determining an inspected object in the semantic region unit.

9 Claims, 8 Drawing Sheets

Figure 1:
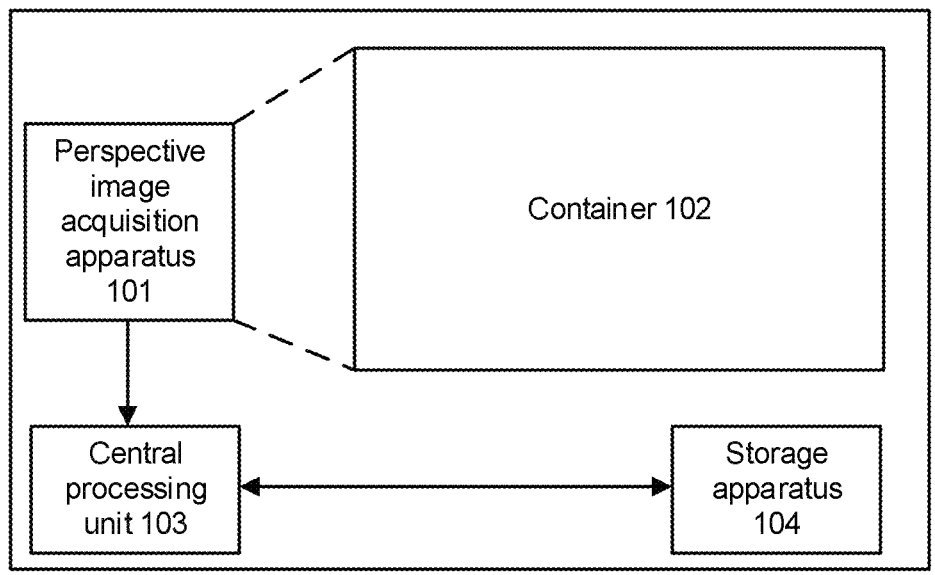

(51) Int. Cl.
*G06V 10/20* (2022.01)
*G06V 10/75* (2022.01)
*G06V 10/764* (2022.01)
*G06V 10/82* (2022.01)
*G06V 20/20* (2022.01)
*G06V 20/52* (2022.01)
*G06Q 10/0832* (2023.01)

(52) U.S. Cl.
CPC ............ *G06V 10/255* (2022.01); *G06V 10/75* (2022.01); *G06V 10/764* (2022.01); *G06V 10/82* (2022.01); *G06V 20/20* (2022.01); *G06Q 10/0832* (2013.01)

(56) References Cited

FOREIGN PATENT DOCUMENTS

| JP | 2018-128897 A | 8/2018 |
|---|---|---|
| JP | 2018-180646 A | 11/2018 |
| JP | 2019-049604 | 3/2019 |
| JP | 2019-215647 A | 12/2019 |

OTHER PUBLICATIONS

Che et al., "A Comprehensive Solution for Deep-Learning Based Cargo Inspection to Discriminate Goods in Containers" 2018 IEEE/CVF Conference on Computer Vision and Pattern Recognition Workshops dated Jun. 18, 2018, in 8 pages.

Cao et al., "Toward Human-in-the-Loop 2,4,5 Prohibited Item Detection in X-ray Baggage Images" 2019 Chinese Automation Congress, IEEE dated Nov. 22, 2019, in 5 pages.

Cui et al., "Automated firearms detection in cargo x-ray images using RetinaNet" SPIE Proceedings, vol. 10999 dated May 14, 2019, in 11 pages.

Yuto Yoshikawa, Examination of eye-camera image analysis method using Mask R-CNN, Technical Report of The Institute of Electronics, Information and Communication Engineers, vol. 118 No. 485, Japan, General, The Institute of Electronics, Information and Communication Engineers, 2019, vol. 118 No. 485, p. 121-p. 125.

Office Action Issued for Japanese Application No. 2021-042729 dated May 10, 2022 in 4 pages.

European Examination Report mailed Jun. 1, 2023, European Application No. 21162895.3, 5 pages.

Japanese Office Action mailed Jun. 1, 2023, with English translation, Japanese Application No. 2021-042729, 8 pages.

Lin, Tsung-Yi et al., "Feature pyramid networks for object detection," 2017 IEEE Conference on Computer Vision and Pattern Recognition, 2017, pp. 936-944.

Lin, Tsung-Yi et al., "Focal loss for dense object detection," 2017 IEEE International Conference on Computer Vision, 2017, pp. 2999-3007.

* cited by examiner

SEMANTIC-BASED METHOD AND APPARATUS FOR RETRIEVING PERSPECTIVE IMAGE

CROSS-REFERENCE TO RELATED APPLICATION(S)

This application claims priority to Chinese Patent Application No. 202010184164.X, filed on Mar. 16, 2020, the disclosure of which is hereby incorporated herein by reference in its entirety.

TECHNICAL FIELD

The disclosed technology relates to the field of image recognition, and in particular to a semantic-based method and apparatus for retrieving a perspective image, an electronic device, and a computer-readable storage medium.

BACKGROUND

Inspecting objects included in a closed space (for example, containers, luggage bags, carriages, vans, small trucks, etc.) using a perspective image is one of important means adopted in customs clearance and other security services. The perspective image is obviously different from a natural image due to imaging principles. Such difference may increase difficulty for an inspector in understanding the image intuitively, thereby reducing the inspector's sensitivity to sensitive objects, and bringing huge challenges to corresponding security services.

Therefore, a more efficient and more precise method is needed for retrieving a perspective image.

SUMMARY

To solve problems in existing technology, a semantic-based method and apparatus for retrieving a perspective image are provided by the disclosed technology. The method includes: a semantic-based image understanding stage, an image feature representation stage, and an image retrieval stage.

In the semantic-based image understanding stage, a semantic element is extracted from a perspective image, and the image is divided into independent object regions (i.e. semantic regions) that are visually separable. Subsequent retrievals are performed individually on each semantic region divided.

In the image feature representation stage, the feature representation is performed on each image semantic region divided. The feature may describe main information of each semantic region in the image.

In the image retrieval stage, each semantic region in the perspective image is retrieved from a history image feature database according to a certain criteria.

In short, the above-mentioned three stages may divide a perspective image into semantic regions, and retrieve history similar regions and history declaration information for each region. This may assist an inspector in compare and analysis of each image semantic region.

In the semantic-based image understanding stage, according to different visual forms or different layouts, a perspective image is split into different semantic regions that are visually separable. All semantic regions are required to cover entire range of the object in the perspective image. Related technology such as objectness proposal is mainly used to solve this problem. In the field of deep learning (e.g., neural network(s), Region Proposal Network (RPN) is a common method. In this stage, the image retrieval is targeted and local, so that each independent region in the image may be refinedly retrieved.

The image feature representation stage is mainly for the feature representation of the image semantic regions divided in the previous stage. In this stage, deep learning technology is used to perform the feature representation on the image. Compared with conventional representation methods, a deep learning method has greater advantages. Features extracted by conventional methods are generally fixed features designed artificially, having certain limitations. While the method based on deep learning autonomously learns more effective features according to characteristics of training data itself. Therefore, the method based on deep learning is more adaptable and more conducive to image retrieval.

A basic unit in the image retrieval stage is each semantic region covering the entire image range divided in the first stage. For each region, a most similar image region may be matched from history images, and declaration information and similarity information of the similar image region may be given. In this way, the inspector may be assisted in comparing each region in the perspective image and understanding each region. The image retrieval stage has a feature of retrieving each region of a mixed perspective image. It should be noted that before retrieving each divided region, a history image feature database needs to be established in advance. Each feature in the history image feature database uses each divided semantic region as a basic unit, and the feature need to have information describing cargo category, region image attribution, declaration information of the image where the region is located, and coordinates of the object region, etc.

Specifically, in a first aspect of the disclosed technology, a semantic-based method for retrieving a perspective image is provided, including: obtaining, by a perspective image acquisition apparatus, a perspective image for a space containing an inspected object therein; performing a semantic division on the perspective image using a first method, to obtain a plurality of semantic region units; constructing a feature extraction network using a second method; extracting, based on the perspective image and each of the plurality of semantic region units, a feature of each semantic region unit using the feature extraction network; and retrieving, based on the feature of each semantic region unit, an image most similar to the semantic region unit from an image feature database, to assist in determining an inspected object in the semantic region unit.

According to the first aspect, the first method is one or more of: selective search, objectness method, and region proposal net RPN.

According to the first aspect, the second method is an introduction of a feature pyramid network FPN into a basic network Resnet.

According to the first aspect, the extracting, based on the perspective image and each of the plurality of semantic region units, a feature of each semantic region unit using the feature extraction network includes: obtaining, based on the perspective image, a feature map for the perspective image using the feature extraction network; and obtaining, based on coordinates of each semantic region unit in the perspective image, a corresponding feature of each semantic region unit in the feature map.

According to the first aspect, the method may further include: fixing a feature dimension of the corresponding feature of each semantic region unit obtained, to normalize the corresponding feature of each semantic region unit to the same feature dimension.

According to the first aspect, the image feature database is established based on history perspective images without suspicious objects, and the perspective images used for establishing the image feature database have one or more item information recorded.

According to the first aspect, the image most similar to the semantic region unit is retrieved from the image feature database based on the item information.

According to the first aspect, there are a predetermined number of images most similar to the semantic region unit existed.

According to the first aspect, the method may further include: displaying, by a display unit, information related to the inspected object.

In a second aspect of the disclosed technology, a semantic-based apparatus for retrieving a perspective image is provided, including: a perspective image acquisition module configured to obtain a perspective image for a closed space containing an inspected object therein; an image semantic division module configured to perform a semantic division on the perspective image using a first method, to obtain a plurality of semantic region units; a feature extraction module configured to: construct a feature extraction network using a second method; and extract, based on the perspective image and each of the plurality of semantic region units, a feature of each semantic region unit using the feature extraction network; and an image retrieval module configured to retrieve, based on the feature of each semantic region unit, an image most similar to the semantic region unit from an image feature database, to assist in determining an inspected object in the semantic region unit.

In a third aspect of the disclosed technology, an electronic device is provided, including: one or more processors; and a memory configured to store one or more programs; wherein when the one or more programs are executed by the one or more processors, cause the one or more processors to implement the method of the first aspect.

In a fourth aspect of the disclosed technology, a computer-readable storage medium is provided, the computer-readable storage medium has executable instructions stored thereon which, when executed by a processor, cause the processor to implement the method of the first aspect.

Based on above aspects, similar images and declaration information may be provided for each semantic region in a perspective image by using image retrieval technology. This may have a positive effect in customs clearance, luggage inspection and other security fields. Current technical means are to retrieve an entire region using pattern recognition, without considering semantic elements of the inspected object. However, in actual applications, it is very necessary to retrieve separable semantic regions as smallest units for mixed inspected objects.

The disclosed technology takes semantic information of an image into consideration. Semantic elements of the image are extracted, each semantic region in the perspective image is used as a basic unit for retrieving, and similar object region and declaration information of each semantic region is given. Thus, an inspector may compare the image regions, so as to improve an ability of assisting in inspection.

BRIEF DESCRIPTION OF THE ACCOMPANYING DRAWINGS

Figure 2:
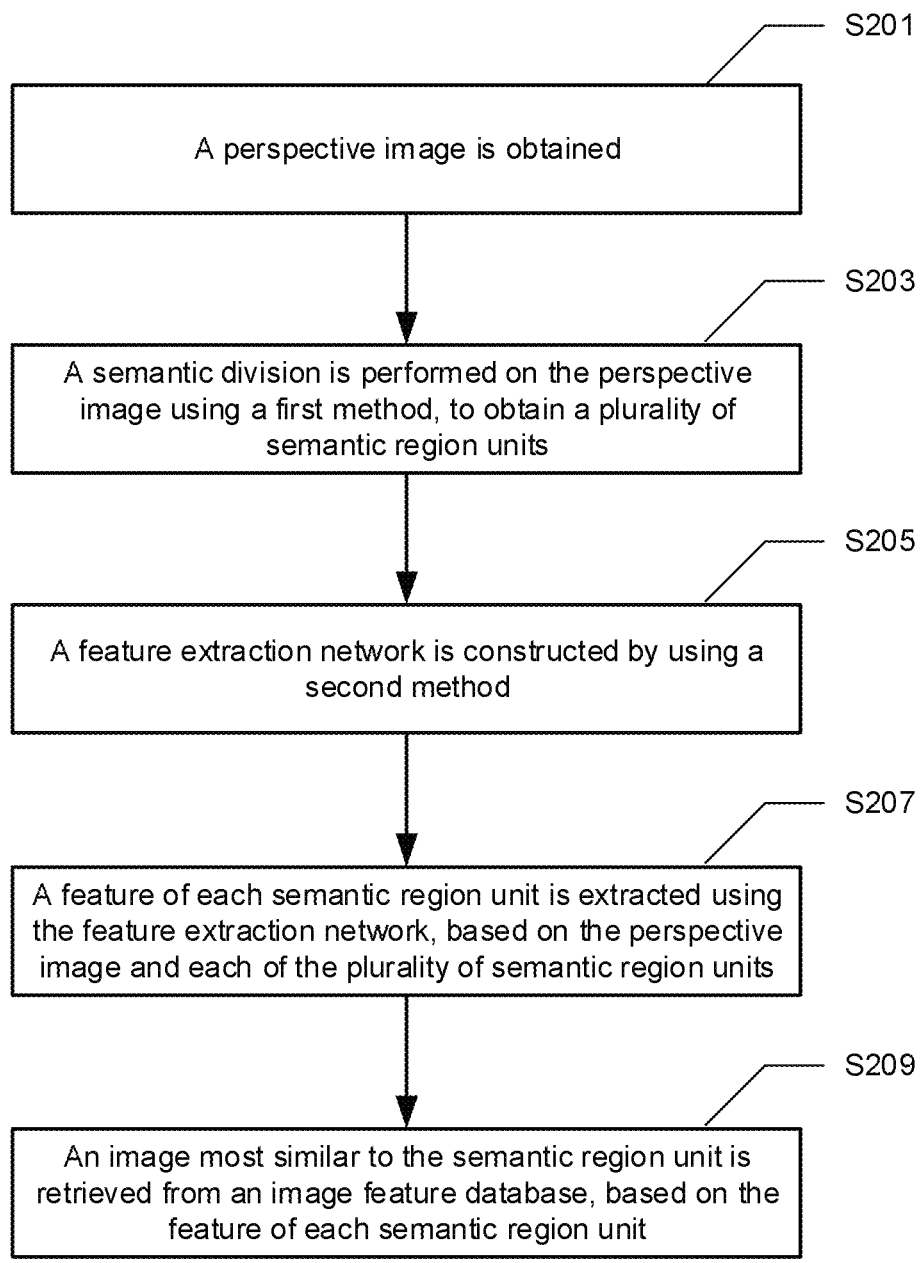
Figure 3:
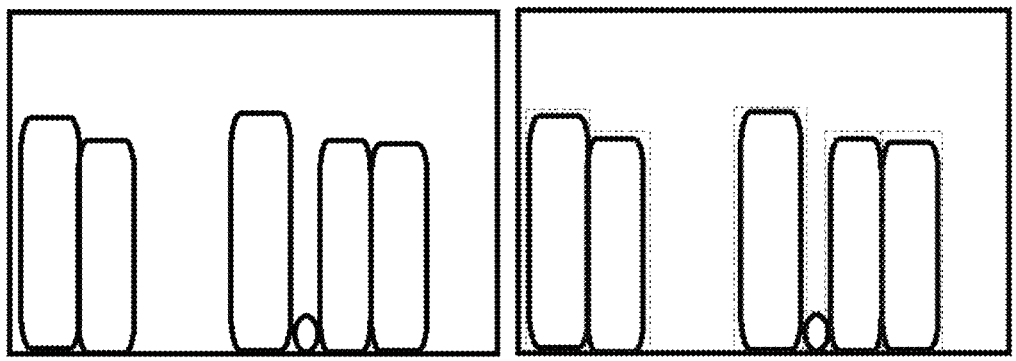
Figure 4:
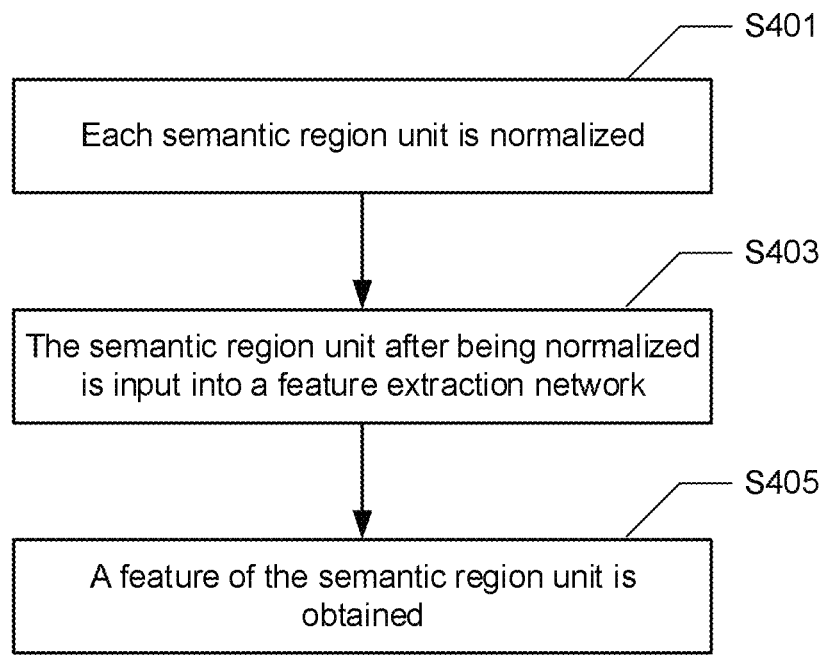
Figure 5:
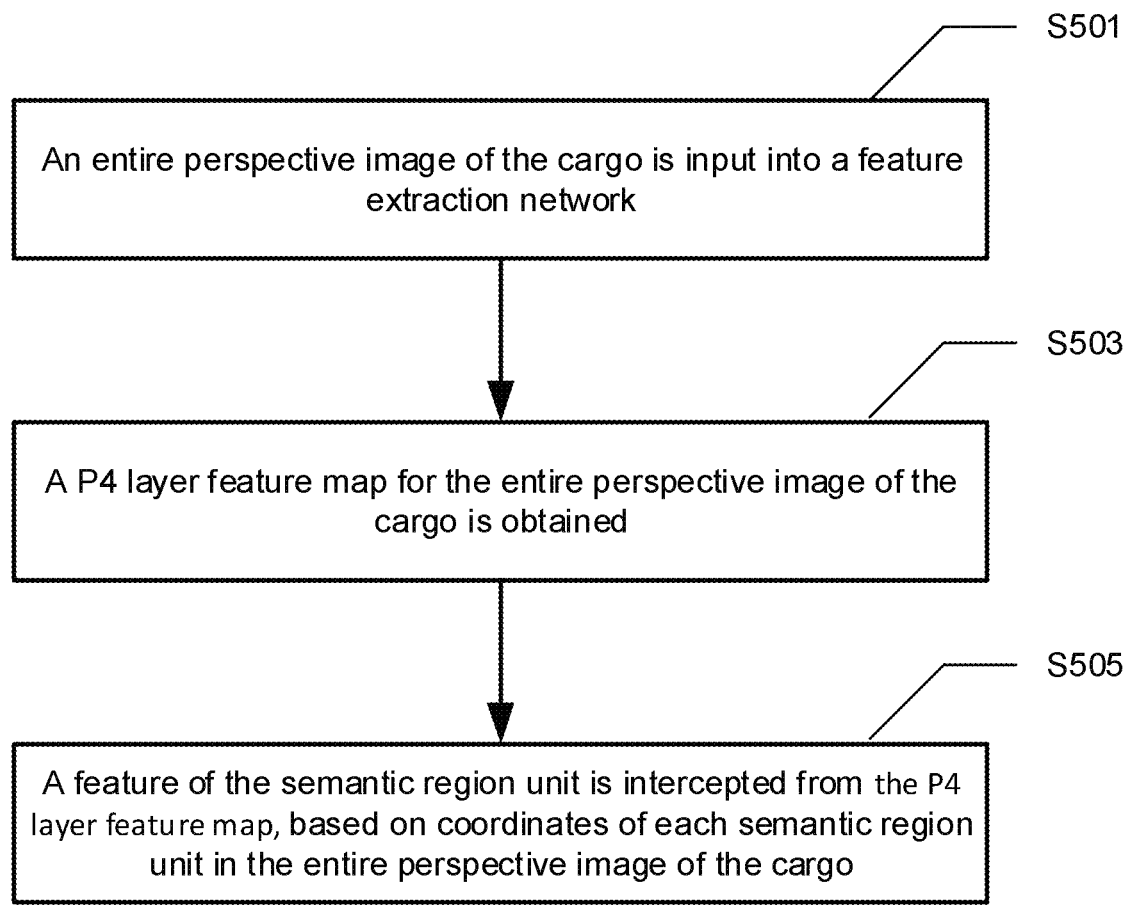
Figure 6:
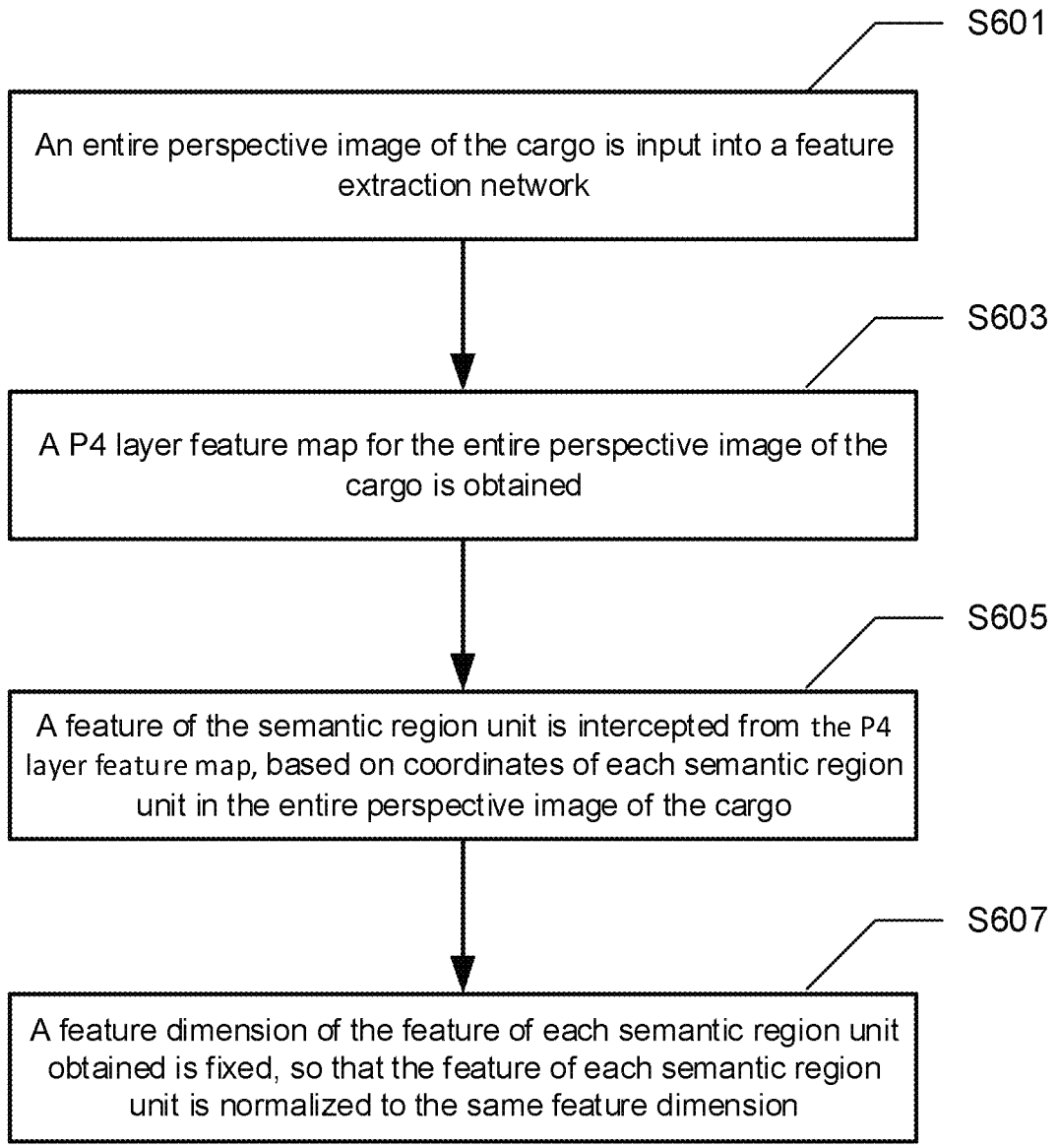
Figure 7:
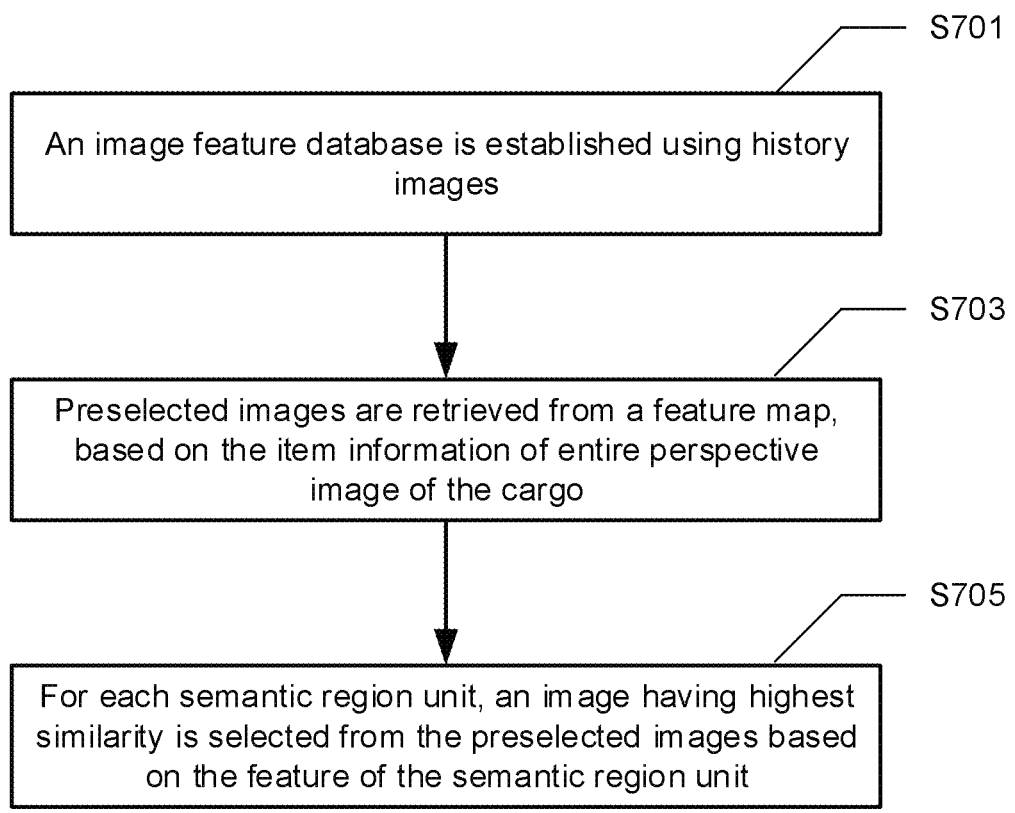
Figure 8:
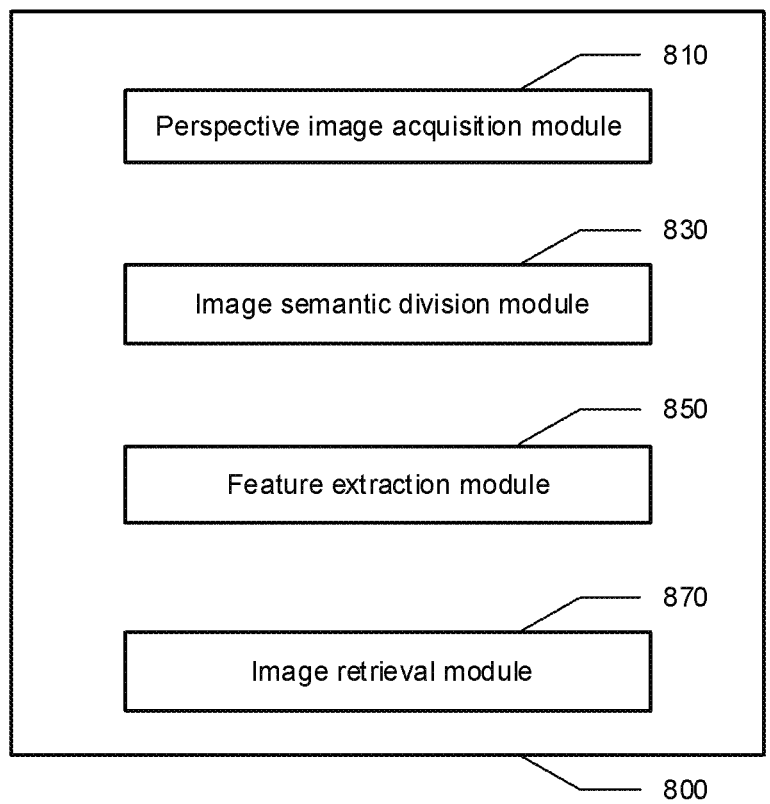
Figure 9:
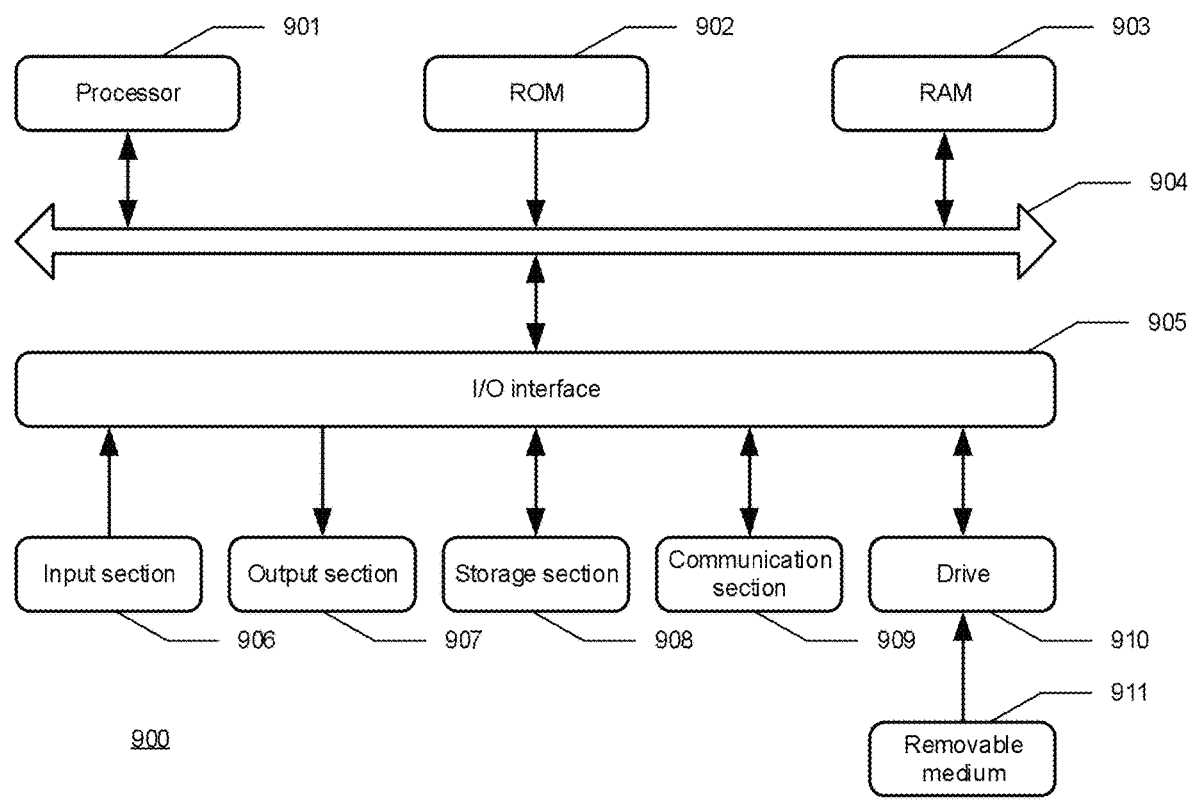

The above and other embodiments and features of the disclosed technology will be more apparent through the detailed description of embodiments of the disclosed technology with reference to the accompanying drawings, in which:

FIG. 1 schematically shows a system architecture of a semantic-based method for retrieving a container cargo according to some embodiments of the disclosed technology;

FIG. 2 schematically shows a flowchart of a semantic-based method for retrieving a container cargo according to some embodiments of the disclosed technology;

FIG. 3 schematically shows perspective images of a cargo before and after a semantic region division according to some embodiments of the disclosed technology;

FIG. 4 schematically shows an example flowchart of extracting a feature of each semantic region unit according to some embodiments of the disclosed technology;

FIG. 5 schematically shows another example flowchart of extracting a feature of each semantic region unit according to some embodiments of the disclosed technology;

FIG. 6 schematically shows another example flowchart of extracting a feature of each semantic region unit according to some embodiments of the disclosed technology;

FIG. 7 schematically shows a flowchart of retrieving each semantic region unit according to some embodiments of the disclosed technology;

FIG. 8 schematically shows a block diagram of a semantic-based apparatus for retrieving a container cargo according to some embodiments of the disclosed technology; and FIG. 9 schematically shows a block diagram of an electronic device suitable for implementing a semantic-based method for retrieving a container cargo according to some embodiments of the disclosed technology.

DETAILED DESCRIPTION

Hereinafter, embodiments of the disclosed technology will be described in details. It should be noted that these embodiments are merely exemplary and are not intended to limit the scope of the disclosed technology. In the following description, many specific details are set forth to provide a comprehensive understanding of the embodiments of the disclosed technology. However, it is obvious to those of ordinary skill in the art that the disclosed technology may further be implemented without these specific details. In addition, descriptions of well-known circuits, materials, or methods are omitted to avoid obscuring the disclosed technology.

Throughout the specification, references to "an embodiment", "embodiments", "an example" or "example" mean that specific features, structures, or characteristics described in conjunction with the embodiment(s) or example(s) are included in at least one embodiment in the disclosed technology. Therefore, the phrases "in an embodiment", "in some embodiments", "an example", or "examples" in various places throughout the specification do not necessarily all refer to the same embodiment or example. In addition, specific features, structures, or characteristics may be combined in one or more embodiments or examples in any suitable combination and/or sub-combination.

It should be understood that when an element is referred as being "coupled" or "connected" to another element, it may be directly coupled or connected to the other element or there may be an intermediate element existed. In contrast, when an element is referred as being "directly coupled" or "directly connected" to another element, there is no intermediate element existed.

In addition, the term "and/or" as used herein includes any and all combinations of one or more of related listed items.

It will be understood that a noun in singular form corresponding to a term may include one or more matters, unless relevant context clearly indicates otherwise. As used herein, each of phrases such as "A or B", "at least one of A and B", "at least one of A or B", "A, B or C", "at least one of A, B and C" and "at least one of A, B, or C" may include all possible combinations of items listed together with a corresponding one of the plurality of phrases. As used herein, terms such as "first" and "second" or "$1^{st}$" and "$2^{nd}$" may be used to simply distinguish one component from another component and not to limit the components in other respects (for example, importance or order).

As used herein, the term "module" may include a unit implemented in hardware, software, or firmware, and may be interchangeably used with other terms (for example, "logic", "logical block", "part" or "circuit"). A module may be a single integrated component adapted to implement one or more functions or a smallest unit or part of the single integrated component. For example, according to some embodiments, a module may be implemented in a form of an application specific integrated circuit (ASIC).

It should be understood that the various embodiments of the disclosed technology and the terms used therein are not intended to limit technical features described to specific embodiments, but include various changes, equivalents, or alternatives to corresponding embodiments. Unless explicitly defined otherwise, all terms will give their broadest possible interpretations, including meanings implied in the specification, meanings understood by those skilled in the art and/or meanings defined in dictionaries, papers, etc.

In addition, those of ordinary skill in the art should understand that the accompanying drawings provided herein are for illustrative purposes, and the drawings are not necessarily drawn to scale. For the description of the drawings, similar reference numbers may refer to similar or related elements. Hereinafter, the disclosed technology will be exemplarily described with reference to the accompanying drawings.

It should be noted that in recent years, artificial intelligence and deep learning technologies have been continuously developed and gradually moved towards production. It is natural to achieve security inspections by using artificial intelligence. At present, technology of inspecting perspective images using artificial intelligence already exists. However, the existing artificial intelligence means are more inclined to an intelligent direction of container inspection in a perspective image, and more inclined to risk prediction.

Image retrieval technology has been widely used, mainly concentrated to natural image retrieval and medical perspective image retrieval. At present, technology of inspecting perspective images also exists. However, the existing technology retrieves a perspective image using conventional machine learning, without considering semantic information of the perspective image and without extracting semantic elements. That is, an image is only retrieved as a whole, and thus the retrieval throughout the perspective image region seems to be rough and inaccurate. However, in fact, there is a high probability that one or more types of objects having various visual forms may appear in the same perspective image. In this situation, in order to thoroughly inspect each independent region, it is very necessary to retrieve individually each visually separable region in the perspective image.

To solve, or otherwise address, the above-described problems, the embodiments of the disclosed technology provides a more efficient and accurate semantic-based method for retrieving a perspective image and an apparatus for implementing the same. The method includes: a perspective image for a space containing an inspected object is obtained by a perspective image acquisition apparatus; a semantic division is performed on the perspective image using a first method, to obtain a plurality of semantic region units; a feature extraction network is constructed using a second method; a feature of each semantic region unit is extracted using the feature extraction network, based on the perspective image and each of the plurality of semantic region units; and an image most similar to the semantic region unit is retrieved from an image feature database, based on the feature of each semantic region unit, to assist in determining or understanding the inspected object in the semantic region unit.

Hereinafter, the disclosed technology will be described in details with reference to the accompanying drawings and in conjunction with specific embodiments.

For clarity and for ease of description, a container is used as a specific example of the space containing the inspected object in the following. Accordingly, a cargo within the container is used as a specific example of the inspected object. However, those skilled in the art should understand that the container, the cargo, and corresponding descriptions (for example, a semantic-based method for retrieving a container cargo, a semantic-based apparatus for retrieving a container cargo, etc.) have no restrictive effect, and are only intended to facilitate describing. Based on different application scenarios of the method, those skilled in the art may replace above descriptions accordingly.

FIG. 1 schematically shows a system architecture 100 of a semantic-based method for retrieving a container cargo according to some embodiments of the disclosed technology.

The system architecture 100 may include a perspective image acquisition apparatus 101, a container 102, a central processing unit 103, and a storage apparatus 104. The perspective image acquisition apparatus 101, the central processing unit 103, and the storage apparatus 104 may communicate with each other.

The perspective image acquisition apparatus 101 may be configured to perform a perspective shot for the container 102, to obtain a perspective image of a cargo within the container 102.

Although only one perspective image acquisition apparatus is shown in FIG. 1, those skilled in the art should understand that there may be two or even more perspective image acquisition apparatuses. In addition, the perspective image acquisition apparatus may be installed in different positions relative to the container 102.

The central processing unit 103 may be configured to perform the following operations: a perspective image of the cargo is obtained by the perspective image acquisition apparatus 101; a semantic division is performed on the perspective image of the cargo, to divide a region occupied by the cargo in the perspective image into a plurality of semantic region units; and each of the semantic region units is retrieved, to assist in understanding or determining the cargo in each semantic region unit.

The central processing unit 103 may include a processor (not shown), and a communication module (not shown), etc.

The processor of the central processing unit 103 may be configured to perform any operations associated with the semantic-based method for retrieving a container cargo.

The communication module may include one or more communication processors capable of operating independently of the processor (for example, an application processor (AP)), and support wired and/or wireless communication. According to some embodiments of the disclosed technology, the communication module may include a wireless communication module (for example, a cellular communication module, a short-distance wireless communication module, or a global navigation satellite system (GNSS) communication module) or a wired communication module (for example, a local area network (LAN) communication module or a power line communication (PLC) module). Respective one of these communication modules may communicate with an external electronic apparatus via a first network (for example, a short-distance communication network such as Bluetooth, Wi-Fi Direct or Infrared Data Association (IrDA)) or a second network (for example, a long-distance communication network such as cellular network, Internet, or computer network (for example, LAN or wide area network (WAN))). These various types of communication modules may be implemented as a single component (for example, a single chip), or multiple components (for example, multiple chips) separated from each other. The wireless communication module may use user information (for example, International Mobile Subscriber Identity (IMSI)) stored in a user identification module to identify and verify an electronic apparatus in the communication network (such as the first network or the second network).

In addition, the central processing unit 103 may also include a display, a microphone, etc., to display or broadcast related information (for example, categories, etc.) of the cargo within a region being currently retrieved.

The storage apparatus 104 may be configured to store data, instructions, etc. required and/or generated when the central processing unit 103 performs any operations associated with the semantic-based method for retrieving the container cargo.

In some exemplary embodiments, the storage apparatus 104 may store a history image of the cargo, declaration information associated with the image of the cargo, an image serial number, coordinates of each cargo region in the history image, a feature of each cargo region, declaration information of each cargo region, generalized category information, name and tax number representing the cargo in the region, etc.

Only some example information stored in the storage apparatus 104 is listed above. Those skilled in the art should understand that various information may be stored in the storage apparatus 104 according to requirements, specific implementations, operations, etc.

FIG. 2 schematically shows a flowchart of a semantic-based method for retrieving a container cargo according to some embodiments of the disclosed technology.

As shown in FIG. 2, the method includes the following operations.

In operation S201, perspective imaging for a container is performed by a perspective image acquisition apparatus, so that a perspective image of a cargo within the container is obtained, where it is possible to see a region occupied by the cargo clearly.

In operation S203, a perspective image of the cargo is obtained from the perspective image acquisition apparatus by a central processing unit, and a semantic division is performed on the perspective image obtained using a first method. Therefore, the image of the region occupied by the cargo in the perspective image is divided into a plurality of semantic region units.

In some exemplary embodiments, the plurality of semantic region units overlaps with each other in a small degree. For example, an overlap region occupies 10%, 5%, 3% of each semantic region unit or even less.

Preferably, only edges of the semantic region units overlap with each other, with no additional overlap regions existed.

As shown in FIG. 3, the semantic division performed on the perspective image of the cargo refers to splitting the region occupied by the cargo into different regions separable for naked eyes, according to visual forms or arrangements of the cargo. In FIG. 3, by performing the semantic division on the perspective image of the cargo, each dotted box region may represent a semantic region unit of the cargo, and all semantic region units together cover entire region occupied by the cargo. Subsequent operations are all performed using the semantic region unit as a basic unit.

In some exemplary embodiments, the first method for performing a semantic region division on the perspective image of the cargo may include, but is not limited to, selective search, objectness technology, and region proposal net (RPN) widely used in deep learning, etc.

Herein, the RPN technology will be used as an example for description.

In the RPN technology, a large amount of object frames that are manually labeled is learned, to obtain a first model. During the semantic region division on the perspective image of the cargo, the first model is firstly used to predict object frames similar to the object frames that are labeled, to recommend an object region of the image.

It should be noted that due to requirements for cargo inspection, the object frames need to cover entire cargo region. Therefore, the RPN network used in the disclosed technology is different from a RPN network used in a conventional target detection. In addition to predicting the object frames, an objective function of the RPN network needs to be further defined, so that the object frames may completely cover the cargo region.

In operation S205, a feature extraction network is constructed by the central processing unit by using a second method. The second method is different from the first method.

In some exemplary embodiments, the second method may be, but is not limited to an introduction of a feature pyramid network FPN into a basic network Resnet.

In operation S207, a feature of each semantic region unit is extracted using the feature extraction network, based on the perspective image of the cargo obtained in operation S201 and the plurality of semantic region units obtained in operation S203.

In operation S209, an image most similar to the semantic region unit is retrieved from an image feature database, based on the feature of each semantic region unit, to assist in determining or understanding the cargo in the semantic region unit.

Exemplarily, the image most similar to the semantic region unit may be determined as appropriate, which may be a most similar image, or a plurality of images having high similarity.

According to the disclosed technology, a basic unit being retrieved is each semantic region unit after the semantic division, therefore, a feature of each semantic region unit is required to be obtained.

FIG. 4 schematically shows an example flowchart of extracting a feature of each semantic region unit according to some embodiments of the disclosed technology.

As shown in FIG. 4, the method includes the following operations.

In operation S401, each semantic region unit is normalized to obtain a semantic region unit having a fixed size.

In operation S403, the semantic region unit after being normalized is input into a feature extraction network.

In operation S405, inputted semantic region unit after being normalized is processed using the feature extraction network, to obtain a feature of the semantic region unit.

FIG. 5 schematically shows another example flowchart of extracting a feature of each semantic region unit according to some embodiments of the disclosed technology.

As shown in FIG. 5, the method includes the following operations.

In operation S501, an entire perspective image of the cargo is input into a feature extraction network.

In operation S503, the entire perspective image of the cargo inputted is processed using the feature extraction network, to obtain a feature map for the entire perspective image of the cargo.

Exemplarily, an FPN network is used to obtain a P4 layer feature map (e.g., a particular pyramid feature map) for the entire perspective image of the cargo.

In operation S505, a feature of the semantic region unit is intercepted from the feature map for the entire perspective image of the cargo obtained, based on coordinates of each semantic region unit in the entire perspective image of the cargo.

FIG. 6 schematically shows another example flowchart of extracting a feature of each semantic region unit according to some embodiments of the disclosed technology.

As shown in FIG. 6, the method includes the following operations.

Operations S601 to S605 are the same as operations S501 to S505 in FIG. 5, and will not be repeated here.

In operation S607, a feature dimension of the feature of each semantic region unit obtained is fixed, so that the feature of each semantic region unit is normalized to the same feature dimension.

Exemplarily, Roi-pooling may be used to fix the feature dimension.

FIG. 7 schematically shows a flowchart of retrieving each semantic region unit according to some embodiments of the disclosed technology.

As shown in FIG. 7, the method includes the following operations.

In operation S701, an image feature database is established using history images.

Exemplarily, each of the history images used for establishing the image feature database may be an image with a single category and without suspicious objects therein.

Exemplarily, the history images used for establishing the image feature database and the perspective image of the cargo being retrieved may have item information. Exemplarily, the item information may include, but is not limited to, serial number of an image, coordinates of each semantic region unit in the perspective image of the cargo, feature representation of each region, declaration information of the cargo, and generalized category information representing the cargo (for example, name and tax number, or an overall feature of the object in the image).

In operation S703, preselected images are retrieved from a feature map, based on the item information of entire perspective image of the cargo.

In operation S705, for each semantic region unit, an image having highest similarity is selected from the preselected images based on the feature of the semantic region unit.

In some exemplary embodiments, the image having highest similarity may be one or more images.

In some exemplary embodiments, the image having highest similarity may be determined based on Euclidean distance.

In some alternative embodiments, all images in the feature database may be used as the preselected images, and then (one or more) similar image(s) may be selected from all the images.

FIG. 8 schematically shows a block diagram of a semantic-based apparatus 800 for retrieving a container cargo according to some embodiments of the disclosed technology.

As shown in FIG. 8, the semantic-based apparatus 800 for retrieving a container cargo may include a perspective image acquisition module 810, an image semantic division module 830, a feature extraction module 850, and an image retrieval module 870.

The perspective image acquisition module 810 may be configured to obtain a perspective image of a cargo within a container.

The image semantic division module 830 may be configured to perform a semantic division on the perspective image of the cargo using a first method, to obtain a plurality of semantic region units.

The feature extraction module 850 may be configured to construct a feature extraction network using a second method; and extract, based on the perspective image and each of the plurality of semantic region units, a feature of each semantic region unit using the feature extraction network.

The image retrieval module 870 may be configured to retrieve, based on the feature of each semantic region unit, an image most similar to the semantic region unit from an image feature database, to determine a category of an inspected object in the semantic region unit.

In addition to above modules 810, 830, 850 and 870, the semantic-based apparatus 800 for retrieving a container cargo may also include other modules to correspondingly perform above operations.

For example, the semantic-based apparatus 800 for retrieving a container cargo may further include a display module configured to display various information (for example, similar history images and matching information) to a user.

In addition to the operations performed by the modules 810, 830, 850 and 870, the modules 810, 830, 850, and 870 may also adaptively perform any suitable operations described above.

For clarity and conciseness, each module and corresponding operations performed thereby will not be repeated here.

Functions of multiple modules according to the embodiments of the disclosed technology may be implemented in one module. One of the modules according to the embodiments of the disclosed technology may be split into multiple modules for implementation. The modules according to the embodiments of the disclosed technology may be implemented at least partially as a hardware circuit, such as a field programmable gate array (FPGA), a programmable logic array (PLA), a system on a chip, a system on a substrate, a system on a package, or an Application Specific Integrated Circuit (ASIC), or may be implemented by hardware or firmware in any other reasonable way that integrates or encapsulates the circuit, or may be implemented by any one of software, hardware and firmware or an appropriate combination thereof. Alternatively, one or more of the modules, sub modules, units and subunits according to the embodiments of the disclosed technology may be at least partially implemented as a computer program module that, when executed, performs the corresponding functions.

At least one of the modules according to the embodiments of the disclosed technology may be implemented at least partially as a hardware circuit, such as a field programmable gate array (FPGA), a programmable logic array (PLA), a system on a chip, a system on a substrate, a system on a package, or an Application Specific Integrated Circuit (ASIC), or may be implemented by hardware or firmware in any other reasonable way that integrates or encapsulates the circuit, or may be implemented by any one of software, hardware and firmware or an appropriate combination thereof. Alternatively, one or more of the modules, sub modules, units and subunits according to the embodiments of the disclosed technology may be at least partially implemented as a computer program module that, when executed, performs the corresponding functions.

FIG. 9 schematically shows a block diagram of an electronic device suitable for implementing the above-mentioned method of semantic-based retrieval for a perspective image according to some embodiments of the disclosed technology. The electronic device shown in FIG. 9 is only an example, and should not bring any limitation to the function and scope of use of the embodiments of the disclosed technology.

As shown in FIG. 9, an electronic device 900 according to the embodiments of the disclosed technology includes a processor 901, which may execute various appropriate actions and processing according to the program stored in a read only memory (ROM) 902 or the program loaded into a random access memory (RAM) 903 from a storage section 908. The processor 901 may, for example, include a general-purpose microprocessor (for example, CPU), an instruction set processor and/or a related chipset and/or a special-purpose microprocessor (for example, an application specific integrated circuit (ASIC)), and the like. The processor 901 may also include an on-board memory for caching purposes. The processor 901 may include a single processing unit or multiple processing units for executing different actions of the method flow according to the embodiments of the disclosed technology.

Various programs and data required for the operation of the electronic device 900 are stored in the RAM 903. The processor 901, the ROM 902 and the RAM 903 are connected to each other through a bus 904. The processor 901 executes various operations of the method flow according to the embodiments of the disclosed technology by executing the programs in the ROM 902 and/or the RAM 903. It should be noted that the program may also be stored in one or more memories other than the ROM 902 and the RAM 903. The processor 901 may also execute various operations of the method flow according to the embodiments of the disclosed technology by executing the programs stored in the one or more memories.

According to the embodiments of the disclosed technology, the electronic device 900 may further include an input/output (I/O) interface 905 which is also connected to the bus 904. The electronic device 900 may further include one or more of the following components connected to the I/O interface 905: an input section 906 including a keyboard, a mouse, etc.; an output section 907 including a cathode ray tube (CRT), a liquid crystal display (LCD), etc. and a speaker, etc.; a storage section 908 including a hard disk, etc.; and a communication section 909 including a network interface card such as a LAN card, a modem, and the like. The communication section 909 performs communication processing via a network such as the Internet. A drive 910 is also connected to the I/O interface 905 as required. A removable medium 911, such as a magnetic disk, an optical disk, a magneto-optical disk, a semiconductor memory, and the like, is installed on the drive 910 as required, so that the computer program read therefrom is installed into the storage section 908 as needed.

The method flow according to the embodiments of the disclosed technology may be implemented as a computer software program. For example, the embodiments of the disclosed technology include a computer program product including a computer program carried on a computer-readable storage medium. The computer program includes a program code for execution of the method shown in the flowchart. In such an embodiment, the computer program may be downloaded and installed from the network through the communication section 909, and/or installed from the removable medium 911. When the computer program is executed by the processor 901, the above-mentioned functions defined in the system of the embodiments of the disclosed technology are performed. According to the embodiments of the disclosed technology, the above-described systems, apparatuses, devices, modules, units, etc. may be implemented by computer program modules.

The disclosed technology also provides a computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the disclosed technology.

According to the embodiments of the disclosed technology, the computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the disclosed technology, the computer-readable storage medium may be any tangible medium that includes or stores programs that may be used by or in combination with an instruction execution system, apparatus, or device. For example, according to the embodiments of the disclosed technology, the computer-readable storage medium may include the above-mentioned ROM 902 and/or RAM 903 and/or one or more memories other than the ROM 902 and RAM 903.

The flowcharts and block diagrams in the drawings illustrate the possible architecture, functions, and operations of the system, method, and computer program product according to various embodiments of the disclosed technology. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the disclosed technology and/or the features described in the claims may be combined in various ways, even if such combinations are not explicitly described in the disclosed technology. In particular, without departing from the spirit and teachings of the disclosed technology, the various embodiments of the disclosed technology and/or the features described in the claims may be combined in various ways. All these combinations fall within the scope of the disclosed technology.

The embodiments of the disclosed technology have been described above. However, these embodiments are for illustrative purposes only, and are not intended to limit the scope of the disclosed technology. Although the embodiments have been described separately above, this does not mean that measures in the respective embodiments cannot be used in combination advantageously. The scope of the disclosed technology is defined by the appended claims and their equivalents. Without departing from the scope of the disclosed technology, those skilled in the art may make various substitutions and modifications, and these substitutions and modifications should all fall within the scope of the disclosed technology.

What is claimed is:

1. A semantic-based method for retrieving a perspective image, comprising: in a cargo inspection process,
    obtaining, by a perspective image acquisition apparatus, a perspective image for a space containing an inspected object therein;
    performing a semantic division on the perspective image using a first method, to obtain a plurality of semantic region units;
    constructing a feature extraction network using a second method;
    extracting, based on the perspective image and each of the plurality of semantic region units, a feature of each semantic region unit using the feature extraction network;
    fixing a feature dimension of the feature of each semantic region unit, to normalize the feature of each semantic region unit to the same feature dimension; and
    retrieving, based on the feature of each semantic region unit, an image most similar to the semantic region unit from an image feature database, to assist in determining an inspected object in the semantic region unit, wherein each feature in the image feature database uses each divided semantic region unit as a basic unit, and each feature in the image feature database has information describing a cargo category, a region image attribution, declaration information of an image where the semantic region unit is located, and coordinates of an object region in the image,
    wherein the extracting, based on the perspective image and each of the plurality of semantic region units, a feature of each semantic region unit using the feature extraction network comprises:
        obtaining, based on the perspective image, a feature map for the perspective image using the feature extraction network; and
        obtaining, based on coordinates of each semantic region unit in the perspective image, the feature of the semantic region unit in the feature map.

2. The method of claim 1, wherein the first method is one or more of:
    selective search, objectness method, and region proposal net RPN.

3. The method of claim 1, wherein the second method is an introduction of a feature pyramid network FPN into a basic network Resnet.

4. The method of claim 1, wherein the image feature database is established based on history perspective images without suspicious objects, and
    wherein the perspective images used for establishing the image feature database have one or more item information recorded.

5. The method of claim 4, wherein the image most similar to the semantic region unit is retrieved from the image feature database based on the item information.

6. The method of claim 1, wherein there are a predetermined number of images most similar to the semantic region unit existed.

7. The method of claim 1, further comprising:
    displaying, by a display unit, information related to the inspected object.

8. An electronic device, comprising:
    one or more processors; and
    a memory configured to store one or more programs;
    wherein when the one or more programs are executed by the one or more processors, cause the one or more processors to implement the method of claim 1.

9. A non-transitory computer-readable storage medium having executable instructions stored thereon which, when executed by a processor, cause the processor to implement the method of claim 1.

* * * * *